(12) United States Patent
Kuperman et al.

(10) Patent No.: US 7,169,376 B2
(45) Date of Patent: Jan. 30, 2007

(54) METHOD FOR MAKING HYDROGEN USING A GOLD CONTAINING WATER-GAS SHIFT CATALYST

(75) Inventors: Alexander Kuperman, Orinda, CA (US); Michael E. Moir, San Rafael, CA (US)

(73) Assignee: Chevron U.S.A. Inc., Sam Ramon, CA (US)

( * ) Notice: Subject to any disclaimer, the term of this patent is extended or adjusted under 35 U.S.C. 154(b) by 50 days.

(21) Appl. No.: 10/866,496

(22) Filed: Jun. 10, 2004

(65) Prior Publication Data

US 2005/0276741 A1    Dec. 15, 2005

(51) Int. Cl.
*C01B 3/16* (2006.01)
*C01B 31/20* (2006.01)
*B01J 27/055* (2006.01)

(52) U.S. Cl. .................. 423/656; 423/247; 423/437.2; 429/17; 502/218

(58) Field of Classification Search ............. 423/437.2, 423/656; 429/17; 502/218
See application file for complete search history.

(56) References Cited

U.S. PATENT DOCUMENTS

| | | | |
|---|---|---|---|
| 4,021,366 A | 5/1977 | Robin et al. | |
| 4,142,988 A | 3/1979 | Chinchen | |
| 4,177,252 A | 12/1979 | Chinchen | |
| 4,564,516 A | 1/1986 | Elliott et al. | |
| 4,835,132 A | 5/1989 | Sambrook | |
| 5,039,503 A | 8/1991 | Sauvion et al. | |
| 5,139,992 A | 8/1992 | Tauster et al. | |
| 5,358,696 A | 10/1994 | Jahnke | |
| 5,464,606 A | 11/1995 | Buswell et al. | |
| 5,744,067 A | 4/1998 | Jahnke | |
| 5,830,425 A | 11/1998 | Schneider et al. | |
| 5,990,040 A | 11/1999 | Hu et al. | |
| 5,993,762 A * | 11/1999 | Rajaram et al. | 423/213.2 |
| 6,077,620 A | 6/2000 | Pettit | |
| 6,096,936 A | 8/2000 | Fukunaga et al. | |
| 6,180,555 B1 * | 1/2001 | Szabo et al. | 502/217 |
| 6,232,005 B1 | 5/2001 | Pettit | |
| 6,287,529 B1 | 9/2001 | Heil et al. | |
| 6,299,995 B1 | 10/2001 | Abdo et al. | |
| 6,332,901 B1 | 12/2001 | Nagamiya et al. | |
| 6,375,924 B1 * | 4/2002 | Towler et al. | 423/656 |
| 6,387,842 B1 * | 5/2002 | Wegman et al. | 502/300 |
| 6,448,198 B1 * | 9/2002 | Szabo et al. | 502/217 |

(Continued)

OTHER PUBLICATIONS

D. J. Wilhelm et al., Syngas production for gas-to-liquids applications : technologies, issues and outlook , Fuel Processing Technology 71 (2001) 139-148, no month.

T. Tabakova et al., "Effect of synthesis procedure on the low-temperature WGS activity of Au/ceria catalysts", Applied Catalysis B: Environmental (2004), no month.

(Continued)

*Primary Examiner*—Wayne A. Langel
(74) *Attorney, Agent, or Firm*—Richard J. Sheridan

(57) ABSTRACT

The present invention relates to a method for making hydrogen comprising contacting in a water-gas shift reaction zone a feed comprising carbon monoxide and water under water-gas shift conditions with an effective catalytic amount of a catalyst comprising highly dispersed gold on a sulfated zirconia, and collecting from the water-gas shift reaction zone an effluent comprising hydrogen and carbon dioxide. The invention also provides a catalyst composition and a method of making the catalyst. In a specific embodiment the invention provides a method for carrying out the water-gas shift reaction in the fuel processor associated with a fuel cell.

15 Claims, 3 Drawing Sheets

U.S. PATENT DOCUMENTS

| | | | |
|---|---|---|---|
| 6,455,182 B1 * | 9/2002 | Silver | 429/17 |
| 6,500,403 B2 | 12/2002 | Ward | |
| 6,509,293 B1 | 1/2003 | Zoeller et al. | |
| 6,521,204 B1 | 2/2003 | Borup et al. | |
| 6,682,838 B2 | 1/2004 | Stevens | |
| 6,723,298 B1 * | 4/2004 | Baumann et al. | 423/437.2 |
| 6,790,247 B2 * | 9/2004 | Childress et al. | 48/198.6 |
| 6,969,505 B2 * | 11/2005 | Tonkovich et al. | 423/648.1 |
| 7,090,789 B2 * | 8/2006 | Schiodt et al. | 252/373 |
| 2004/0137288 A1 * | 7/2004 | Morgenstern | 429/17 |
| 2005/0095189 A1 * | 5/2005 | Brey et al. | 423/427 |

OTHER PUBLICATIONS

Gary Jacobs et al., "Water-gas shift : in situ spectroscopic studies of noble metal promoted ceria catalysts for CO removal in fuel cell reformers and mechanistic implications", Applied Catalysis A: General (2004), no month.

Gary Jacobs et al., "Water-gas shift :comparative screening of metal promoters for metal/ceria systems and role of the metal", Applied Catalysis A: General 258 (2004) 203-214, no month.

Tatyana Tabakova et al., "FTIR study of low-temperature water-gas shift reaction on gold/ceria catalyst", Applied Catalysis A : General 252 (2003) 385-397, no month.

Jinming Hua et al., "Influence of calcinations temperature on the structure and catalytic performance of Au/iron oxide catalysts for water-gas shift reaction", Applied Catalysis A: General 259 (204) 121-130, no month.

Akula Venugopal et al., "The gold-ruthenium-iron oxide catalytic system for the low temperature water-gas-sift reaction the examination of gold-ruthenium interactions", Applied Catalysis A: General 245 (2003) 249-158, no month.

Tatyana Tabakova et al., "Influence of the microscopic properties of the support on the catalytic activity of $Au/ZnO$, $Au/ZrO_2$, $Au/Fe_2O_3$, $Au/Fe_2O_3$-$ZnO$, $Au/Fe_2O_3$-$ZrO_2$ catalysts for the WGS reaction", Applied Catalysis A: General 202 (2000) 91-97, no month.

Masatake Haruta et al., "Advances in the catalysis of Au nanoparticles", Applied Catalysis A: General 222 (2001) 427-437, no month.

Newsom, David S., "The Water-Gas Shift Reaction", Catal. Rev.—Sci. Eng., 21(2), p. 275-318 (1980)), no month.

Topsoe, H. et al. "Mössbauer Spectroscopy of CO Shift Catalysts Promoted with Lead", Journal of Catalysis, 31, p. 346-359 (1973)), no month.

Qi Fu et al., "Active Nonmetallic Au And Pt Species On Ceria-Based Water-Gas Shift Catalysts", Science, vol. 301, Aug. 15, 2003.

* cited by examiner

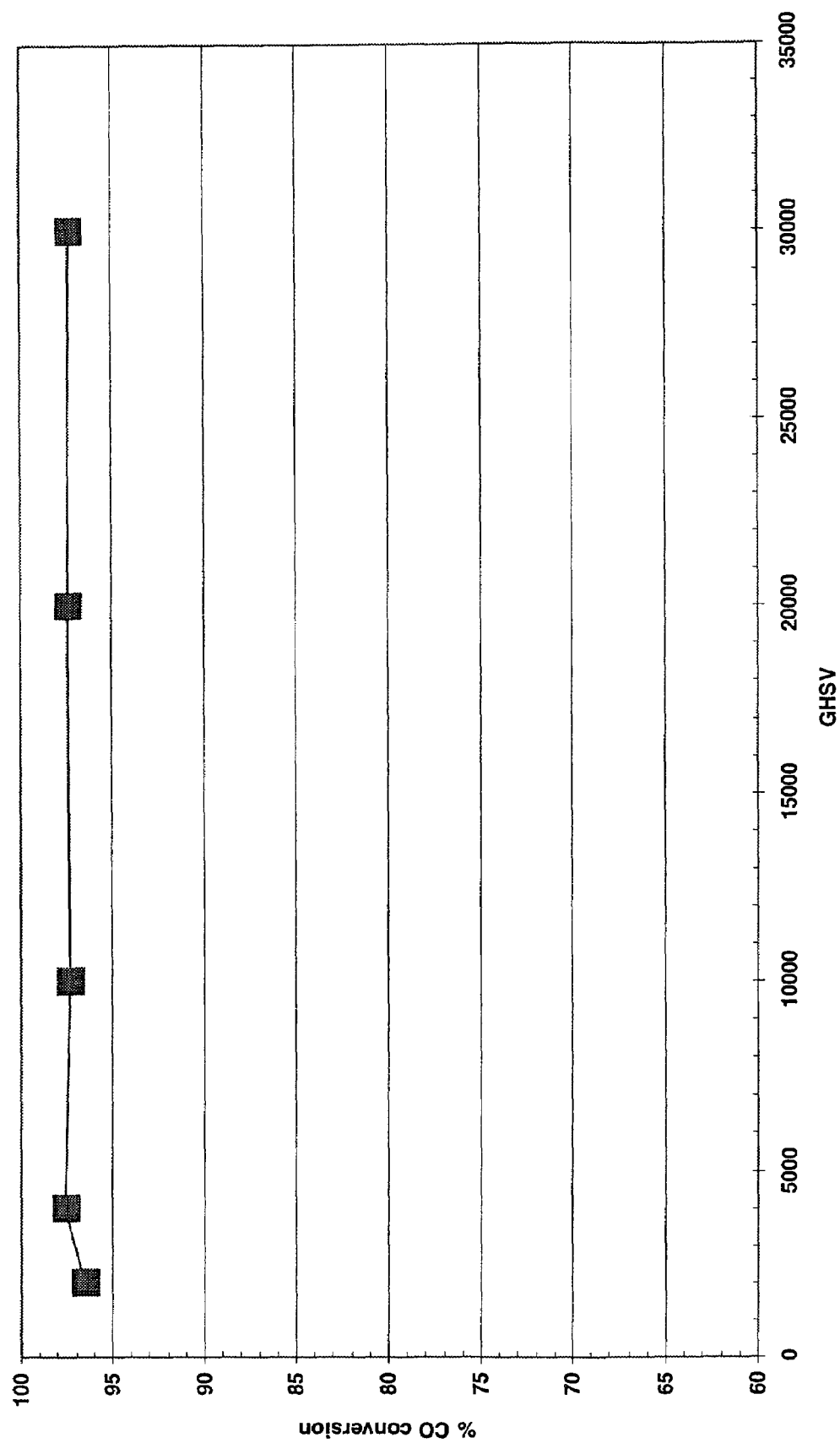
Figure 1. Performance of Novel Au on Calcined Sulfated Zirconia Catalyst at 240 °C

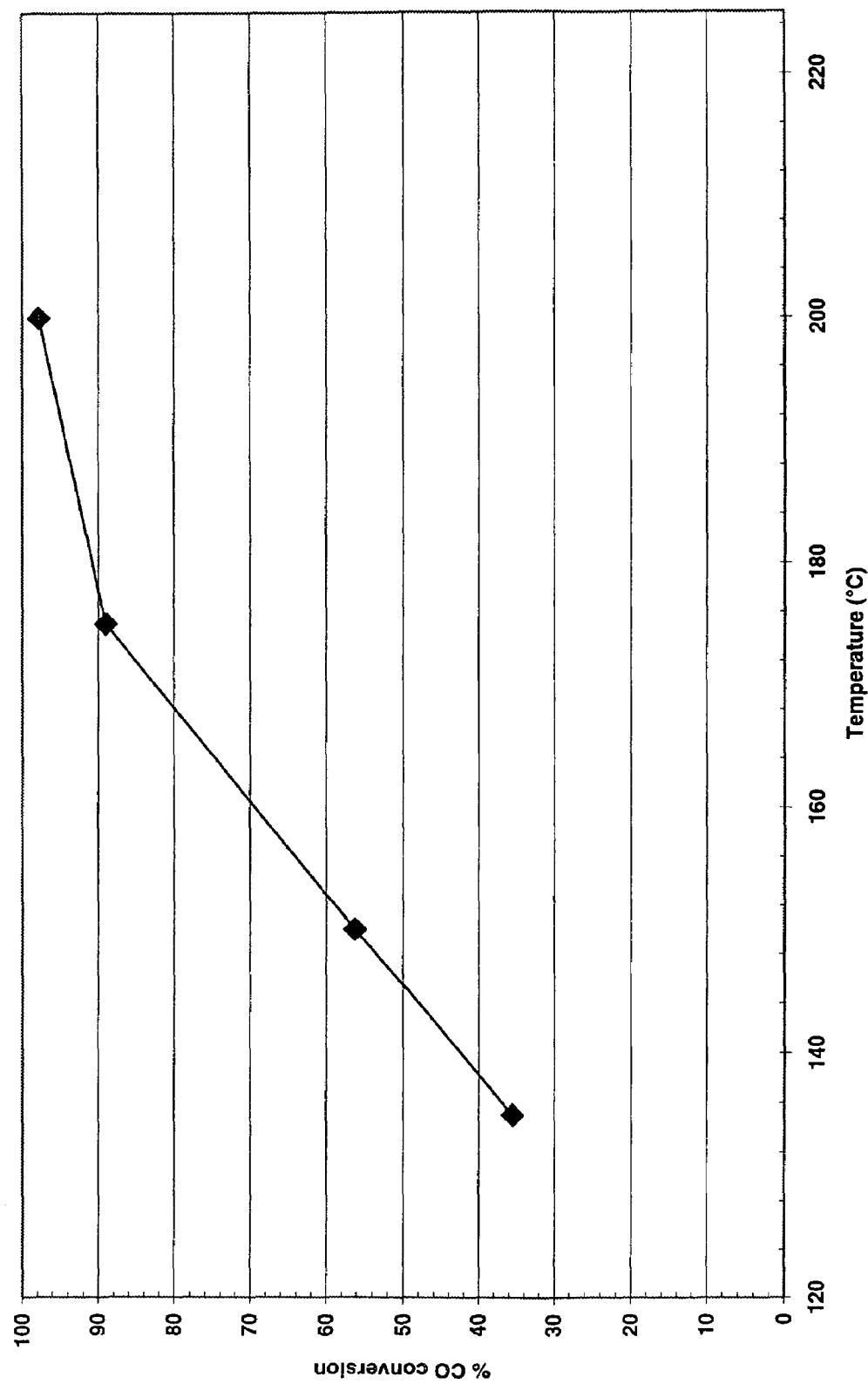
Figure 2. Performance of Novel Au on Calcined Zirconia Catalyst at 20,000 GHSV

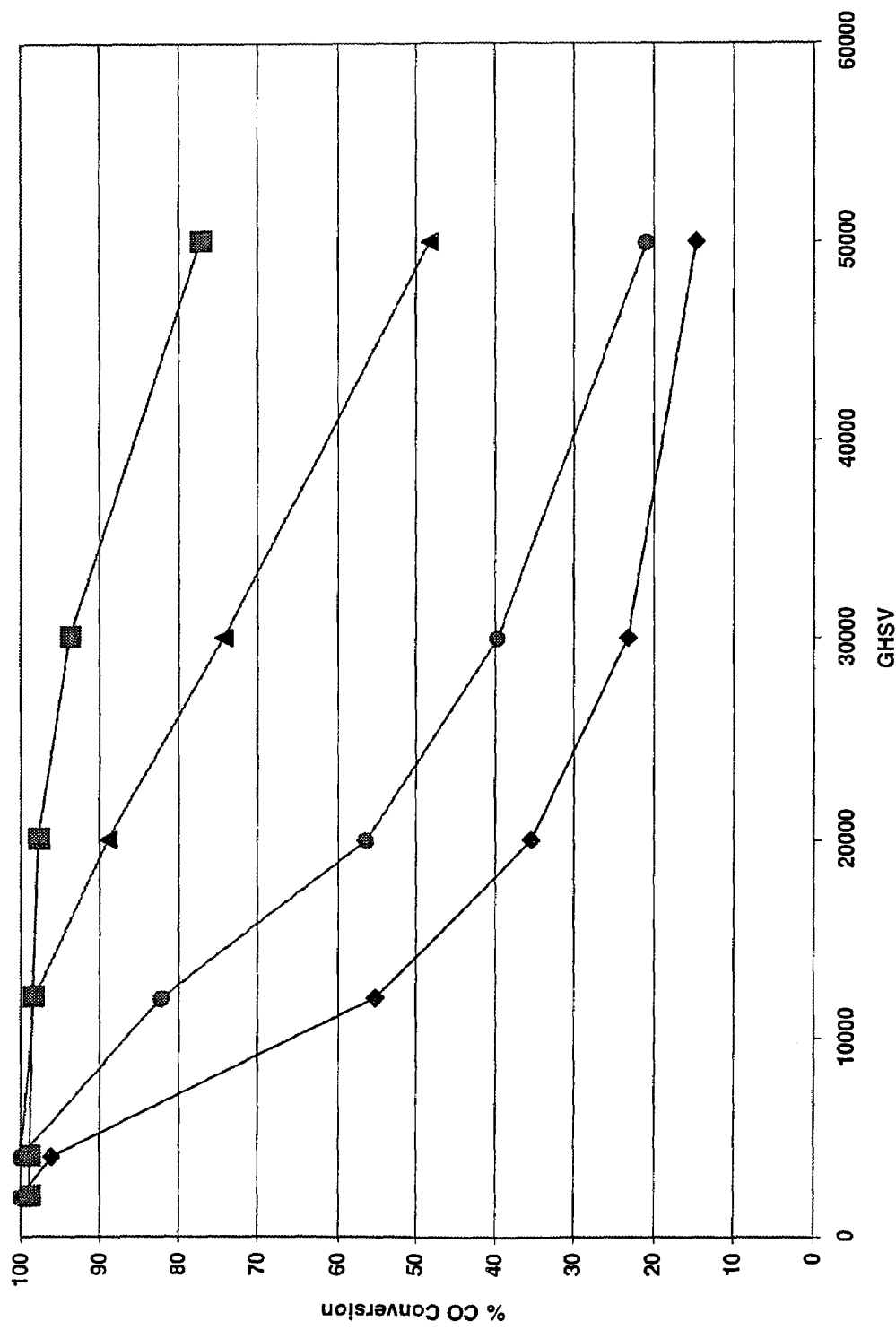
Figure 3. Peformance of Novel Au on Calcined Sulfate Zirconia Catalyst at a Range of Temperatures and Space Velocities.

METHOD FOR MAKING HYDROGEN USING A GOLD CONTAINING WATER-GAS SHIFT CATALYST

BACKGROUND OF THE INVENTION

Hydrogen is an indispensable component for many petroleum and chemical processes as well as increasingly in other areas such as a fuel for Fuel Cells. Refineries in the petroleum industry, and methanol, cyclohexane, and ammonia plants in the chemical industry consume considerable quantities of hydrogen during processes for the production of gasoline and fertilizers and other chemical products. As environmental regulations demand cleaner, renewable and non-polluting processes and products, most of the hydrogen balances at petroleum refineries are becoming negative. As laws mandate lower aromatics in gasoline and diesel fuels, $H_2$ is now consumed in aromatic saturation and thus, less $H_2$ is available as a by-product. At the same time, $H_2$ consumption is increasing in hydro-treating units in the refineries because many of these same laws require lower sulfur levels in fuels.

Hydrogen can be obtained as a byproduct in the catalytic reforming of naphtha. In particular, significant amounts of hydrogen can be obtained during dehydrocyclization of naphtha in selective processes such as the Aromax™ process. Hydrogen is also obtained by steam reforming methane or mixture of hydrocarbons, a reaction which produces synthesis gas which comprises hydrogen, carbon dioxide and carbon monoxide (CO). Synthesis gas represents one of the most important feedstocks of the chemical and petroleum industries. It is used to synthesize basic chemicals, such as methanol or oxyaldehydes, as well as for the production of ammonia and pure hydrogen. However, synthesis gas produced by the steam reforming of hydrocarbons does not meet the requirements for further use in some processes because the $CO/H_2$ ratio is too high. Therefore it is industrial practice to reduce or adjust the CO content in the syngas by conversion with steam in what is often referred to as the water-gas shift (WGS) reaction.

To improve $H_2$ yield and also the operating efficiency of carbon monoxide conversion, the water-gas shift reaction is extensively used in commercial hydrogen or ammonia plants. The reaction can be described as:

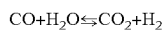

$$CO + H_2O \leftrightarrows CO_2 + H_2$$

The water-gas shift reaction is usually divided into a high temperature process and a low temperature process. The high temperature process is generally carried out at temperatures within the range of between about 350 and about 400 degrees C. The low temperature water-gas shift reaction typically takes place between about 180 and about –240 degrees C.

While lower temperatures favor more complete carbon monoxide conversion, higher temperatures allow recovery of the heat of reaction at a sufficient temperature level to generate high pressure steam. For maximum efficiency and economy of operation, many plants contain a high temperature reaction unit for bulk carbon monoxide conversion and heat recovery and a low temperature reaction unit for final carbon monoxide conversion.

Chromium-promoted iron catalysts have been used in the high temperature process at temperatures above about 350 degrees C. to reduce the CO content to about 3–4% (see, for example, D. S. Newsom, Catal. Rev., 21, p. 275 (1980)). As is known from the literature (see for example, H. Topsoe and M. Boudart, J. Catal., 31, p. 346 (1973)), the chromium oxide promoter combines two functions. It serves to enhance catalytic activity and acts as a heat stabilizer, i.e., it increases the heat stability of magnetite, the active form of the catalyst, and prevents unduly rapid deactivation.

Unfortunately, when chromium is used, especially in hexavalent form, expenditures must be incurred to guarantee worker safety both during production and later handling of the catalyst, and health hazards cannot be fully ruled out despite considerable effort. In addition, the spent catalyst ultimately poses a hazard to man and the environment and must be disposed of with allowance for the government regulations relating to toxic waste.

Catalysts used for the water-gas shift reaction at low temperature (or so-called low temperature shift reaction) in industry generally contain copper oxide, zinc oxide and aluminum oxide. Because these catalysts operate at relatively low temperature, they generate equilibrium carbon monoxide concentrations of less than 0.3% in the exit gas stream over an active low temperature shift catalyst. However, carbon monoxide conversion and hydrogen yield gradually decreases during normal operations as a result of deactivation of the catalyst. Deactivation can be caused by sintering and poisoning such as by traces of chloride and sulfur compounds in the feed and the hydrothermal environment of the reaction. The rate of the hydrothermal deactivation, in particular, is dependent on reaction conditions such as the temperature, the steam to gas ratio and composition of the feed gas mixture, and the formulation and manufacturing process of the catalyst.

Although copper is physically and physicochemically stabilized by both zinc oxide and aluminum oxide and attempts of further stabilization of the catalyst have been made as taught by prior art, sintering of copper crystallite is still thought to be a significant cause for deactivation/aging of the catalyst, especially when there are very low concentrations of poisons in the feed. For example, the copper crystallite size of a fresh catalyst can range from 30–100 angstroms in contrast with 100–1,000 angstroms for a discharged spent catalyst. Low temperature shift catalysts thus need to be improved with regard to activity and stability.

Another use for hydrogen that is becoming increasingly important is as a feedstock to a fuel cell to generate electricity. The Proton Exchange Membrane (PEM) fuel cell is one of the most promising fuel cell designs and PEM fuel cells are already commercially available in limited applications. PEM fuel cells as well as several other fuel cell designs currently in development require hydrogen as a feedstock along with oxygen. Processes being considered to supply the needed hydrogen include Steam Reforming, Partial Oxidation (POX), Autothermal Reforming, and variations thereof. Most such processes for hydrogen generation also produce Carbon Monoxide (CO). Yet many Fuel Cells, in particular PEM fuel cells, cannot tolerate CO and in fact can be poisoned by small amounts of CO. The water-gas shift reaction can be used to generate additional hydrogen and convert the CO into the more inert $CO_2$. Many fuel cells including PEM fuel cells can tolerate $CO_2$ although it can act as a diluent.

As mentioned above one of the most common methods for the hydrogen production using hydrocarbons is the steam reforming process or variations thereof. The main process step involves the reaction of steam with a hydrocarbon over a catalyst at about 800° C. to produce hydrogen and carbon oxides. It is typically followed by several additional steps to remove impurities and carbon oxide by-products (particularly CO) as well as to maximize hydrogen production. In the water-gas shift reaction carbon monoxide reacts with steam to produce carbon dioxide and additional hydrogen. This is often done in two steps. The high temperature shift (HTS) reaction usually runs at about 350° C. and reduces CO levels to about 1%–2%. The low temperature shift (LTS) reaction runs at about 200° C. and reduces the amount of CO down to about 0.1%–0.2%. In both cases, ideally the reaction is run in an excess of steam and at the lowest temperature possible to achieve the target conversion. Conventional iron/chromium-containing HTS catalysts are inactive below about 300° C. and copper/zinc-containing LTS catalysts lose the activity above about 250° C. Both the HTS and LTS catalysts require in-situ reduction treatments and are extremely air sensitive. All currently available LTS catalysts are either pyrophoric or have a relatively low activity. Some of them are based on expensive precious metals such as Pt, Pd, Rh. The pyrophoric nature of LTS catalysts contributes to an unacceptably rapid deactivation rate.

In the preparation of hydrogen for fuel cells, the WGS reaction zone can be the largest component of the fuel processor affecting its size, weight and performance factors such as its start-up time. Therefore, a WGS catalyst is needed which is air stable, low cost, and has high activity. In addition a WGS method that can operate over a wider temperature window without deactivation is needed. The present invention provides such a catalyst and method.

SUMMARY OF THE INVENTION

The present invention provides a method for making hydrogen, a catalyst useful in said method and a method of making the catalyst. Accordingly, in one embodiment the present invention is directed to a method for making hydrogen comprising contacting in a water-gas shift reaction zone a feed comprising carbon monoxide and water under water-gas shift conditions with an effective catalytic amount of a catalyst comprising highly dispersed gold on a sulfated zirconia, and collecting from the water-gas shift reaction zone an effluent comprising hydrogen and carbon dioxide. The present invention utilizes an effective catalytic amount of a catalyst comprising gold highly dispersed on sulfated zirconia and optionally promoters. An effective catalytic amount means the minimum amount of catalyst required to catalyze the water-gas shift reaction.

The invention is also directed to a catalyst composition useful in water-gas shift reactions which comprises highly dispersed gold on sulfated zirconia. The catalyst of the present invention is particularly useful because it is non-pyrophoric and can be exposed to air without rapidly deactivating. The catalyst and method of the present invention surprisingly is highly effective for both low temperature and high temperature water-gas shift reactions. Furthermore the catalyst is highly stable and is much less prone to deactivation than prior catalysts. The low deactivation rate of the method and catalyst of the present invention is thought to be due at least in part to the sulfating. Prior WGS processes and catalysts are typically effective for either high temperature water-gas shift or low temperature water-gas shift but not both. The present invention provides a method and catalyst that provides excellent CO conversion in the water-gas shift reaction over a wide range of process conditions. The excellent performance is seen at conditions comprising a surprising range of temperatures and space velocities. In one embodiment the present invention thus provides a catalyst suitable for use in a water-gas shift reaction to produce hydrogen from CO and $H_2O$, comprising:

(1) sulfated zirconia having a sulfur content of between 0.02 and 1.0 wt % based on the weight of zirconia;
(2) gold highly dispersed in the zirconia; and
wherein the gold content is between 0.001 and 4.0 wt % based on the weight of zirconia.

Among other factors the present invention provides a WGS method, a WGS catalyst, and a method of making the catalyst that has enhanced performance over prior methods and catalysts. In particular the method and catalyst of the present invention are usable under both high temperature and low temperature shift conditions. In addition the catalyst and method of the present invention has a particularly low deactivation rate. The fact that the catalyst and method of the present invention is usable under both HT and LT shift conditions make it uniquely well suited for use in a fuel processor used for making hydrogen for use in a fuel cell. In such a fuel processor high conversion to hydrogen in the WGS reaction is required and very low levels of CO in the product hydrogen is essential. The method and catalyst of the present invention helps achieve both of those requirements—high conversion to $H_2$ and low levels of effluent CO.

In an embodiment of the present invention the catalyst of the present invention can be used in both high temperature shift and low temperature shift conditions in order to maximize the conversion of CO in the overall process. In this embodiment a feed comprising CO and water is passed over a catalyst comprising gold on sulfated zirconia (zirconium oxide) at high temperature water-gas shift conditions to produce an effluent having a reduced CO content. At least a portion of said effluent is passed over a catalyst comprising gold on sulfated zirconia at low temperature water-gas shift conditions to produce a second effluent comprising hydrogen and carbon dioxide.

The method and catalyst of the present invention has a number of specific embodiments. These embodiments include, for example the use of the method and catalyst of the invention in producing hydrogen by the water-gas shift reaction for use in a PEM fuel cell. In one embodiment the present invention may be used for producing hydrogen for use in a PEM fuel cell used to power a motor vehicle.

More specifically, the present invention provides a method for carrying out the water-gas shift reaction in a fuel processor associated with a fuel cell which comprises contacting in a water-gas shift reaction zone a feed comprising carbon monoxide and water under water-gas shift conditions with an effective catalytic amount of a catalyst comprising highly dispersed gold on a sulfated zirconia, and collecting from the water-gas shift reaction zone an effluent containing a significantly reduced amount of carbon monoxide as compared to the feed.

Another embodiment of the present invention is directed at a method of making a water-gas shift catalyst, said method comprises:

sulfating a zirconium hydroxide to form a sulfated zirconium hydroxide having a sulfate content of at least 0.1 wt % sulfate based on the zirconium hydroxide;

calcining the sulfated zirconium hydroxide to form zirconia; and depositing gold on the zirconia to form a gold loaded sulfated zirconia having a gold content of 0.001 to 4.0 wt % and a sulfur content of between 0.02 and 1 wt % both based on the weight of zirconia.

As discussed above one embodiment of the present invention the water-gas shift reaction can be carried out under both HT shift and LT shift conditions. This can be done in discrete zones where one zone is at HT shift conditions and another zone is at LT shift conditions. Alternatively the water-gas shift reaction can be carried out in a zone or zones having a continuum of conditions including both HT and LT shift conditions. The catalyst and method of the present invention is particularly well suited for such a continuum because of its activity at both HT and LT water-gas shift conditions.

The present invention may be used in conjunction with several syngas generating processes including autothermal reforming, steam reforming, and partial oxidation (POX). Another embodiment of the present invention uses the method and catalyst of the present invention in congunction with syngas generation from a steam reformer to convert a portion of the CO produced by the steam reformer to hydrogen. In this embodiment of the present invention a desired CO/Hydrogen ratio in the effluent can be selected to suit the downstream use for the syngas. Thus the method and catalyst of the present invention can be used to achieve a desired CO/Hydrogen ratio for use in a Fischer-Tropsch process to make hydrocarbons from syngas.

In a specific preferred embodiment of the present invention, hydrogen can be produced in a reactor or multitude of reactors that comprise an autothermal reforming zone to convert a feed comprising hydrocarbons to at least some hydrogen, water, and CO; a water-gas shift zone operating at a continuum of conditions including both HT and LT shift conditions where the water and CO are converted at least in part to hydrogen and $CO_2$; and a oxidation zone where remaining CO is oxidized to $CO_2$ to achieve a product comprising hydrogen containing low levels of CO suitable for use in a fuel cell.

DETAILED DESCRIPTION OF THE INVENTION

The present invention provides a novel catalyst for the Water-Gas Shift reaction, a method for preparing this catalyst and a method for conducting the water-gas shift reaction in the presence of this catalyst. The catalyst of this invention show substantially higher activity and stability when compared to other catalysts. The catalyst of the present invention comprises highly dispersed gold on a crystalline sulfated zirconia support optionally in association with modifiers and additives such as, for example Group I, Group II and rare earth oxides. Surprisingly we have discovered that unusually active and stable WGS catalysts can be prepared when sulfated zirconia is used for the catalyst preparation. The presence of sulfate is critical for making the catalyst of the present invention with its outstanding performance. In a preferred embodiment of the catalyst of the present invention it has been found that the sulfur level should be at least 0.02 wt % based on the weight of zirconia (also referred to as zirconium oxide or $ZrO_2$). Preferably the sulfur level of the catalyst should be between 0.02 and 4.0 wt % based on the weight of zirconium oxide more preferably between 0.02 and 3.5 wt %, still more preferably between 0.02 and 2.5 wt % and most preferably between 0.02 and 1 wt % based on the wt of the zirconium oxide.

We have further discovered that the catalyst of the present invention can operate in what is considered to be high temperature shift range down into the low and even ultra low temperature range. Thus the process of the present invention when using the novel catalyst of the invention is able to operate over a temperature range from about 100 degrees C. to about 500 degrees C.

In a typical preparation, the catalysts of this invention are prepared by an aqueous gold deposition onto a calcined sulfated zirconia support. This is usually followed by drying in air at around ambient temperature or slightly higher, e.g., about 35° C. Prior to use the catalyst is generally activated in the reactor under nitrogen at 250° C. for about 2 hours.

Not wishing to be bound by any particular theory we believe that it is extremely important to keep gold from reducing to a zero valence metal state during the gold deposition process. Also it is believed that the sulfated zirconia support plays a critical role in keeping gold well dispersed. Additionally it is believed that it is advantageous for at least some of the zirconia to be in the tetragonal phase.

In a preferred embodiment of the present invention a majority of the zirconia in the catalyst should be in the tetragonal phase, more preferably the zirconia should be predominately in the tetragonal phase. The phase of the zirconia can be determined by the PXRD (Powder X-Ray Diffraction) pattern of the catalyst sample. The X-ray diffraction pattern can be used to determine the phase of the zirconia due to the different phases exhibit characteristic lines in the pattern.

It was demonstrated by scanning electron microscopy (SEM) and transmission electron microscopy (TEM) that the catalysts of this invention preferably have no detectable gold particles after gold deposition and drying steps. In the catalyst and method of the present invention the gold loading of the catalyst should be at least 0.001 wt % based on the weight of zirconium oxide in the catalyst. Preferably the gold loading of the catalyst should be between 0.001 and 5.0 wt %, more preferably between 0.001 and 4.0 wt %, still more preferably between 0.01 and 3.0 wt %, even more preferably between 0.1 and 3.0 wt %, and most preferably between 0.1 and 2.0 wt % based on the weight of zirconium oxide in the catalyst.

Another important feature of the catalyst of the present invention is that the gold be very highly dispersed on the catalyst. The methods for gold loading described in the Detailed Description of the Present Invention and in the Examples can lead to a very highly dispersed catalyst. Activation conditions must also be carefully selected to avoid agglomeration of the gold and loss of the very high dispersion. It is preferred that at least 80 wt % of the gold be dispersed in particles of less than 10 angstroms when measured by TEM. More preferably at least 90 wt % of the gold should be dispersed in particles of less than 10 angstroms when measured by TEM. Most preferably there should be no detectable gold particles on the catalyst after gold deposition and drying steps when examined by TEM and SEM.

There is a trade off between the amount of surface area and stabiliy of the sulfated zirconia support. So it is important that the zirconia surface area of the sulfated zirconia support be carefully controlled. The BET (Brunauer, Emmett, Teller) surface area of the sulfated zirconia support should be at least 5 $m^2/g$, preferably at least 10 $m^2/g$, more preferably between 10 and 500 $m^2/g$, still more preferably between 30 and 250 $m^2/g$ and most preferably between 50 and 100 $m^2/g$. The BET surface area can be determined using ASTM D 4567 (volume 5.03) or ASTM D 3663 which are incorporated herein by reference.

As mentioned above it is also critical to the present invention that the catalyst comprise sulfated zirconia. It has been found that by employing the sulfated catalyst described above that the method of the present invention displayed surprisingly low deactivation rates. Methods for making a sulfated zirconia material suitable for use as a starting material in the preparation of the catalyst of the present invention can be found in U.S. Pat. Nos. 6,448,198 and 6,180,555 which are incorporated herein in their entirety. In addition to the sulfated zirconia, the catalyst of the present invention optionally can include an additional structural support material such as a refractory metal oxide material such as for example silica, alumina, magnesia, titania, etc. and mixtures thereof. The structural support can be in any form including for example monolith, spheres, or hollow cylinders. More specifically the metal oxide material can include "supports" such as alumina, silica, silica-alumina, silicate, alumino-silicate, magnesia, zeolite, active carbon, titanium oxide, thorium oxide, clay and any combination of these supports. In one embodiment of the present invention preferably, the invention's catalyst can contain between 50% and 95% by weight of structural support, on which 5% to 50% of sulfated zirconia by weight is deposited.

In the method of the present invention the catalyst has been found to be effective at a surprisingly broad range of temperatures. In the method of the present invention the water-gas shift reaction can be carried out between 100 and 500° C. preferably between 135 and 420° C. It is understood by one of skill in the art that as catalysts become less active the reaction temperature may be increased to achieve a target conversion. However, increasing temperatures leads to an increased concentration of CO due to a shift in equilibrium.

Space velocities useable in the method of the present invention as measured by gas hourly space velocity (GHSV) are between 1000 $h^{-1}$ to 200,000 $h^{-1}$, preferably between 10,000 $h^{-1}$ to 100,000 $h^{-1}$, more preferably between 25,000 $h^{-1}$ to 100,000 $h^{-1}$. It is understood by one of skill that the space velocity can be decreased to compensate for lower activity.

As mentioned above in one embodiment of the present invention the method can optionally include a CO oxidation zone in order to reduce the level of CO in the $H_2$ such that it is suitable for use in a fuel cell such as a PEM fuel cell. A potential advantage of the present invention is that the WGS method of the present invention can be used to convert most of the CO while also making hydrogen and leaving only a small amount or trace amount of CO to be oxidized in the CO oxidation zone. This means that the CO oxidation zone can be smaller in size and can further reduce the size and complexity of a fuel processor system. Under some circumstances the CO oxidation zone may be eliminated entirely. An example of a fuel processor that includes a combination partial oxidation/steam reforming zone, WGS zone, and CO oxidation zone is shown in U.S. Pat. No. 6,521,204 which is incorporated herein in its entirety.

EXAMPLES

Example 1

Preparation of a Sulfated Zirconia Base Material

This example shows the preparation of a mass sulfated zirconia material that can be used as a base for the catalyst of the present invention. 35 g of $ZrO(NO_3)_2$, $6H_2O$ is dissolved in 350 ml of distilled water with agitation. Zirconium hydroxide gel is precipitated by adding 17 ml of a 28% ammonia solution while agitating. The final pH is about 8.5. After filtering and washing until a pH 7 (redispersal in 350 ml of water), the gel is dried overnight at 120 degrees C. The result is about 13.8 g of a solid. The sulfation is done by adding 85 ml of sulfuric acid (1 N), by static contact for 15 minutes. The spinning then takes place over a Buchner funnel, then the drying is done overnight at 120 degrees C.

Example 2

Preparation of Sulfated Zirconia on an Alumina Support

This example shows the preparation of a structurally supported sulfated zirconia base that can be used in the catalyst of the present invention. The catalyst sample is prepared starting from 25 g of an alumina support, marketed by AKZO under the name CK 300, previously calcined at 600 degrees C. The zirconium deposition is done in a ball by impregnating the support with a solution formed by the dissolution of 3.48 g of zirconyl chloride ($ZrOCl_2$, $8H_2O$, marketed by Prolabo also available from Aldrich) and 0.46 g of $NH_4Cl$ in 11 $cm^3$ of distilled water, with a volume corresponding to the porous volume of the support. The solid obtained is first dried overnight at 120 degrees C. then calcined for 2 hours at 650 degrees C. This operation is repeated twice (deposit of zirconium three times), then the solid obtained is calcined for 4 hours at 750.degree. C. Thereafter, the sulfation of the zirconium deposited on the surface of the alumina support takes place by circulating 162 $cm^3$ of a sulfuric acid solution (5 N) at room temperature for 1 hour. Then the solid is spun-dry then allowed to dry overnight at 120 degrees C. Next it is calcined for 2 hours at 500 degrees C. in a flow of dry air at 60 liters per hour.

Example 3

Preparation of Calcined Sulfated Zirconia

A sample of sulfated zirconium hydroxide powder containing about 2% wt of sulfate was calcined in air at 660° C. according to the following procedure. Sulfated zirconium hydroxide can be obtained from commercial sources such as Aldrich. The sample was heated up to 660° C. slowly over 10 hours and kept at this temperature for 6 hrs, followed by slow cooling to ambient temperature. The nitrogen BET (Brunauer, Emmett, Teller) surface area of the powder before the calcinations was found to be 284 $m^2/g$ and after the calcinations it was 75 $m^2/g$. The starting powder was amorphous by PXRD. The PXRD pattern of the calcined material was that of the tetragonal phase of zirconia containing a small amount of the monoclinic phase.

Example 4

Preparation Gold on Calcined Sulfated Zirconia Catalyst (Gold Addition)

The gold was deposited on the calcined sample from Example 3 by first preparing a solution of 0.34 g of $HAuCl_4 \times 3H_2O$ in 600 ml of distilled water and then heating the solution to about 60° C. The acidity of the solution was adjusted to pH 8.6 by the addition of a 1.0 M sodium carbonate solution. 6 g of the calcined sulfated zirconia sample was added to the solution and stirred for 2 to 3 hrs by slow rotation in a rotary evaporator. The resulting solid was removed by filtration and dried in an air convection oven at 35° C. overnight. Finally the dry powdered sample was pressed and sized to −18/+40 (US) mesh for the reactor testing. The resulting catalyst had a nitrogen BET surface area unchanged of about 75 $m^2/g$. The PXRD pattern of the gold deposited sample showed both tetragonal and monoclinic phases of zirconia present in almost equal amounts. Elemental analysis results for various samples prepared by the above procedure showed that he amount of sulfate decreased to about 0.26% wt. and the gold loading were in the range of 1% wt. to 2% wt.

Example 5

Near Incipient Wetness Impregnation

The catalyst of this invention can also be prepared by near incipient wetness impregnation procedures of a gold compound on the sulfated zirconia support.

Example 6

Performance of the Gold-Sulfated Zirconia Catalyst 2 cc of the catalyst from Example 2 was diluted with 6 cc of acid-washed alundum of the same size and loaded into a ½" O.D. stainless steel tube reactor. The catalyst bed was held in place with alundum and glass wool plugs on both ends. The catalyst was heated to 250° C. at a rate of 50° C./h in a 200 sccm flow of nitrogen overnight and then cooled to a test temperature.

The catalyst were tested in the temperature range of 135° C. to 420° C. at space velocities of 2000 $h^{-1}$ to 50000 $h^{-1}$ based upon the volume of catalyst. Two different gas mixtures were used in the testing. The gas mixtures were produced either by blending four syngas components—CO, $H_2$, $N_2$ and $CO_2$ in a manifold or by using a mixture of a pre-defined composition. Water was introduced to the gas stream as vapor produced by heating the stream of liquid water in a small flash vessel just below the boiling point of water at the reactor pressure. For example, for the reaction mixture of the following composition—11% vol. CO, 25.6% vol. $H_2$, 6.8% vol. $CO_2$, 31.1% vol. $N_2$, 25.4% vol. $H_2O$, at 20,000 GHSV, 200° C. and 30 psig the catalyst had constant activity at equilibrium CO conversion of about 98.2% for the time it had been tested of about 350 hours. At the same conditions but 350° C. the catalyst run at constant activity and equilibrium conversion of about 86.1%. The results of catalyst performance at 240° C. over a range of space velocities for the reaction mixture composition of 4.65% vol. CO, 34.31% vol. $H_2$, 7.43% vol. $CO_2$, 13.73% vol. $N_2$, 36% vol. $H_2O$ are shown in FIG. 1. The changes of the catalyst activity with temperature at 20,000 GHSV are shown in FIG. 2 and with space velocity at different temperatures in FIG. 3 for this same gas mixture. Finally, for both reaction mixtures it was demonstrated that the catalyst could be cooled down to an ambient temperature in air, then heated back to a reaction temperature and restarted without loss of activity repeatedly.

Comparative Example 7

Preparation of Gold on Zirconia Catalyst in the Absence of Sulfate

A sample of gold on zirconia was prepared as follows. 0.33 g of $HAuCl_4 \times 3H_2O$ was added to 600 ml of deionized water then heated to 60 degrees C. The pH was adjusted by dropwise addition of 1 N $Na_2CO_3$ until the solution cleared. The final pH was 8.55. 3.09 g of zirconium IV oxide extrudate was placed in a round bottom flask along with the gold containing solution. The flask was placed on a rotory evaporator and immersed in a bath that was maintained at 60 degrees C. The flask was allowed to rotate for 2 hours 10 minutes. The extrudate was then filtered from the solution. The extrudate had maintained their shape and rigidity after filtering. The extrudate was dried.

Comparative Example 8

Performance of Gold on Zirconia Catalyst in the Absence of Sulfate 1.5 cc (1.7 g) of the Au on zirconia catalyst formed in Comparative Example 7 was loaded into a WGS tube reactor. The sample was first diluted with 6.5 cc of acid-washed 24/48 alundum and loaded into the ½" OD stainless steel tube reactor. The catalyst bed was held in place with alundum and glass wool plugs on both ends. The reactor was heated to 200 degrees C. with a $N_2$ flow rate of 200 cc/min. The temperature was held at 200 degrees C. for 1 hour then the Syngas mixture was introduced as the feed. The pressure was raised to 30 psig and the Syngas flow rate was set at 80.0 cc/min. $H_2O$ was injected at a flow rate of 0.0165 ml/hr to achieve a space velocity of 4000 $hr^{-1}$. The process achieved a CO conversion initially of as much as 85%. However at constant temperature (200 degrees C.) after 10 hours the conversion declined to about 72% and after 20 hours to about 64%.

Example 9

Performance of Au on Sulfated Zirconia Catalyst 2.0 cc (2.45 g) of Au on sulfated zirconia catalyst was loaded into a WGS tube reactor. The sample was first diluted with 6.0 cc of acid-washed 24 mesh alundum and loaded into the ½" OD stainless steel tube reactor. The catalyst bed was held in place with alundum and glass wool plugs on both ends. The reactor was heated to 200 degrees C. with a $N_2$ flow rate of 200 cc/min. The temperature was held at 200 degrees C. for 1 hour then the Syngas mixture was introduced as the feed. The pressure was raised to 30 psig and the Syngas flow rate was set at 80.0 cc/min. $H_2O$ was injected at a flow rate of 0.0165 ml/hr to achieve a space velocity of 4000 $hr^{-1}$. The process achieved a CO conversion initially of as much as 96%. After 20 hours of operation the conversion was at about 95%. This example shows that the Au on sulfated zirconia achieves better conversion and better stability than unsulfated Au on zirconia catalyst (see comparative example 8) at the same process conditions.

What is claimed is:

1. A method for making hydrogen comprising contacting in a water-gas shift zone a feed comprising carbon monoxide and water, under water-gas shift conditions, with a catalyst comprising highly dispersed gold on sulfated zirconia, and collecting from the water-gas shift reaction zone an effluent comprising hydrogen and carbon dioxide.

2. The method of claim 1 wherein the water-gas shift conditions are high temperature shift conditions.

3. The method of claim 1 wherein the water-gas shift conditions are low temperature shift conditions.

4. The method of claim 1 wherein the catalyst comprises at least 0.02 wt. % sulfur based on the weight of zirconia.

5. The method of claim 1 wherein the catalyst comprises at least 0.001 wt. % gold based on the weight of zirconia.

6. The method of claim 5 wherein the catalyst comprises between 0.1 and 3.0 wt % gold based on the weight of zirconia.

7. The method of claim 1 wherein the catalyst before activation has at least 90% of the gold dispersed in particles of less than 10 angstroms when measured by TEM.

8. The method of claim 1 wherein the catalyst comprises between 0.02 and 2.5 wt % sulfur based on the weight of zirconia.

9. The method of claim 1 wherein the water-gas shift conditions comprise both high temperature and low temperature shift conditions at different points in the water-gas shift reaction zone.

10. A method of making hydrogen, comprising:
a) passing a feed comprising CO and water over a catalyst comprising gold on sulfated zirconia at high temperature water-gas shift conditions to produce a first effluent having a reduced CO content; and
b) passing at least a portion of said first effluent over a catalyst comprising gold on sulfated zirconia at low temperature water-gas shift conditions to produce a second effluent comprising hydrogen and carbon dioxide.

11. The method of claim 10 wherein the first effluent has a CO content of between 1 and 10 wt %, and the second effluent has a CO content of less than 0.2 wt %.

12. The method of claim 10 wherein the high temperature water-gas shift conditions comprise a temperature of between 250 and 450° C., and the low temperature water-gas shift conditions comprise a temperature of between 100 and 250° C.

13. The method of claim 10 wherein step a) and step b) occur in the same reactor.

14. A method for carrying out the water-gas shift reaction in the fuel processor associated with a fuel cell which comprises contacting in a water-gas shift reaction zone a feed comprising carbon monoxide and water under water-gas shift conditions with an effective catalytic amount of a catalyst comprising highly dispersed gold on sulfated zirconia, and collecting from the water-gas shift reaction zone an effluent containing a significantly reduced amount of carbon monoxide as compared to the feed.

15. The method of claim 14 wherein the water-gas shift conditions comprise both high temperature and low temperature shift conditions at different points in the water-gas shift reaction zone.

* * * * *